(12) United States Patent
Matsumura et al.

(10) Patent No.: US 7,603,008 B2
(45) Date of Patent: Oct. 13, 2009

(54) OPTICAL FIBER COUPLING PART AND MANUFACTURING METHOD THEREOF

(75) Inventors: Hiroyoshi Matsumura, Saitama (JP); Taro Suzuki, Tokyo (JP); Toru Achiwa, Tokyo (JP)

(73) Assignee: Toyo Glass Co., Ltd., Tokyo (JP)

( * ) Notice: Subject to any disclaimer, the term of this patent is extended or adjusted under 35 U.S.C. 154(b) by 158 days.

(21) Appl. No.: 10/569,279

(22) PCT Filed: Feb. 1, 2005

(86) PCT No.: PCT/JP2005/001407
§ 371 (c)(1),
(2), (4) Date: Oct. 27, 2006

(87) PCT Pub. No.: WO2006/082625
PCT Pub. Date: Aug. 10, 2006

(65) Prior Publication Data
US 2008/0131052 A1    Jun. 5, 2008

(51) Int. Cl.
*G02B 6/32* (2006.01)
(52) U.S. Cl. .......... 385/35; 359/652
(58) Field of Classification Search .......... 385/33–34
See application file for complete search history.

(56) References Cited

U.S. PATENT DOCUMENTS

| | | | |
|---|---|---|---|
| 3,823,995 A * | 7/1974 | Carpenter | 385/124 |
| 3,910,677 A * | 10/1975 | Becker et al. | 385/33 |
| 4,701,011 A | 10/1987 | Emkey et al. | |
| 4,962,988 A | 10/1990 | Swann | |
| 5,254,148 A | 10/1993 | Inami et al. | |
| 5,356,840 A * | 10/1994 | Noda | 501/12 |
| 5,384,874 A * | 1/1995 | Hirai et al. | 385/34 |
| 5,448,409 A * | 9/1995 | Noda | 359/654 |
| 5,837,023 A * | 11/1998 | Koike et al. | 65/17.2 |

(Continued)

FOREIGN PATENT DOCUMENTS

JP    54-158241    12/1979

(Continued)

OTHER PUBLICATIONS

Safaai-Jazi et al., "A Tapered Traded-Index Lens: Analysis of Transmission Properties and Applications in Fiber-Optic Communication Systems," 1997, IEEE Journal of Quantum Electronics, V. 33, N. 12, pp. 2159-2166.*

(Continued)

*Primary Examiner*—Frank G Font
*Assistant Examiner*—Peter Radkowski
(74) *Attorney, Agent, or Firm*—Wenderoth, Lind & Ponack, L.L.P.

(57) ABSTRACT

An optical fiber coupling part that reduces the difficulty in adjusting cores, minimizes coupling loss, and prevents optical characteristics from deteriorating. An optical fiber is fused to one end of a GRIN lens which includes a quartz glass containing one or more refractive index regulating substances selected from $Sb_2O_3$, $Ta_2O_5$, $TiO_2$ or $ZrO_2$. Optical characteristics are not deteriorated because an adhesive is not used, and self-alignment effects facilitate adjustment of the cores of the GRIN lens and the optical fiber. Furthemore, coupling loss can be minimized by setting a refractive index distribution constant g of the GRIN lens within an appropriate range.

1 Claim, 3 Drawing Sheets

U.S. PATENT DOCUMENTS

| | | | | |
|---|---|---|---|---|
| 5,865,867 | A * | 2/1999 | Kinoshita | 65/17.3 |
| 5,881,195 | A * | 3/1999 | Walker | 385/116 |
| 6,032,487 | A * | 3/2000 | Kinoshita | 65/17.2 |
| 6,219,481 | B1 * | 4/2001 | Cheng | 385/47 |
| 6,250,108 | B1 * | 6/2001 | Kinoshita et al. | 65/17.2 |
| 6,542,665 | B2 | 4/2003 | Reed et al. | |
| 6,594,419 | B2 * | 7/2003 | Ukrainczyk et al. | 385/33 |
| 6,743,517 | B2 * | 6/2004 | Nakamura et al. | 428/447 |
| 6,806,295 | B2 * | 10/2004 | Hu | 516/22 |
| 6,881,189 | B2 * | 4/2005 | Ogawa | 600/459 |
| 2002/0014182 | A1 * | 2/2002 | Yadav et al. | 106/400 |
| 2002/0076134 | A1 * | 6/2002 | Singh | 385/16 |
| 2002/0140942 | A1 | 10/2002 | Fee et al. | |
| 2002/0141714 | A1 | 10/2002 | Reed et al. | |
| 2002/0150333 | A1 * | 10/2002 | Reed et al. | 385/34 |
| 2003/0118305 | A1 | 6/2003 | Reed et al. | |
| 2004/0028329 | A1 | 2/2004 | Reed et al. | |
| 2005/0007675 | A1 * | 1/2005 | Matsumoto et al. | 359/652 |
| 2005/0220401 | A1 * | 10/2005 | Jiang et al. | 385/28 |
| 2006/0148635 | A1 * | 7/2006 | Miyauchi et al. | 501/65 |

FOREIGN PATENT DOCUMENTS

| | | |
|---|---|---|
| JP | 62-501732 | 7/1987 |
| JP | 1-270524 | 10/1989 |
| JP | 2-64131 | 3/1990 |
| JP | 4-317425 | 11/1992 |
| JP | 5-178622 | 7/1993 |
| JP | 6-138342 | 5/1994 |
| JP | 8-82779 | 3/1996 |
| JP | 2002-328255 | 11/2002 |
| JP | 2002-350666 | 12/2002 |
| JP | 2003-066252 | 3/2003 |
| JP | 2004-198976 | 7/2004 |
| JP | 2004-219554 | 8/2004 |
| JP | 2004-530927 | 10/2004 |
| WO | 02/103404 | 12/2002 |

OTHER PUBLICATIONS

Shingyouchi et al., "r-GRIN TiO2-SiO2 glass rods prepared by a sol-gel method," 1986, Electronic Letters., V. 22,N. 21, pp. 99-10.*

Shingyouchi et al., "Radial gradient refractive-index glass rods prepared by a sol-gel method," 1986, Electronic Letters.,V. 22, No. 2, pp. 99-10.*

Shigeru Hirai, et al., "*GI Fiber Lens·Mochiita Hikari Isolator no Shinraisei Hyoka*", 1995 Nen The Institute of Electronics, Information and Communication Engineers Sogo Taikai Koen Ronbunshu Electronics 1, Mar. 10, 1995, p. 283.

W.L. Emkey et al., "*Analysis and Evaluation of Graded-Index Fiber-Lenses*", Journal of Lightwave Technology, Sep. 1987, vol. LT-5, No. 9, pp. 1156-1164.

P. Chanclou et al., "*Design and Demonstration of a Multicore Single-mode Fiber Coupled Lens Device*", Optics Communications, Apr. 1, 2004, vol. 233, issues 4-6, pp. 333-339.

K. Shingyouchi et al., "*Gradient-index Doped Silica Rod Lenses Produced by a Solgel Method*", Applied Optics, Oct. 1, 1990, vol. 29, No. 28, pp. 4061-4063.

S. Konishi et al., "*r-GRIN Glass Rods Prepared by a Sol-gel Method*", Journal of Non-Crystalline Solids, 1988, vol. 100, No. 1/3, pp. 511-513.

K. Shingyouchi, et al., "*r-GRIN TiO$_2$-SiO$_2$ Glass Rods Prepared by a Sol-gel Method*", Electronics Letters, Oct. 9, 1986, vol. 22, No. 21, pp. 1108-1110.

M. Laczka et al., "*GRIN-Glasses Prepared by Sol-gel Method*", Proceedings of the SPIE—The International Society for Optical Engineering, 1996, vol. 2943, pp. 95-104.

* cited by examiner

OPTICAL FIBER COUPLING PART AND MANUFACTURING METHOD THEREOF

BACKGROUND OF THE INVENTION

1. Technical Field

The present invention relates to an optical fiber coupling part, namely, an optical fiber with a lens for coupling a light emitting source such as a semiconductor laser used for optical communication and an optical fiber with high coupling efficiency, and a manufacturing method thereof.

2. Description of Related Art

A technique for coupling a semiconductor laser and an optical fiber is one of the most important techniques in optical communication. For example, conventional methods of coupling the semiconductor laser and the optical fiber include a method using a tip ball fiber whose tip part is spherical (see U.S. Pat. No. 3,910,677), or a method using a convex lens such as a spherical lens or an aspherical lens.

Since formed in small size, the method using the tip ball fiber is capable of coupling the semiconductor laser array and an optical fiber array. This tip ball optical fiber is integrally formed with a hemispherical lens part at the tip of a single mode optical fiber. Meanwhile, when making the tip ball part of the optical fiber, a problem is that conventionally the tip part of the fiber is polished all around, and therefore mass-productivity is deteriorated and it takes significant labor hours to produce. Another problem is that, since the tip of the optical fiber is spherical, coupling efficiency is deteriorated due to spherical aberrations. Specifically, a light beam emitted from a laser end face reaches the end face of the single mode optical fiber at different positions and at different angles, depending on the exit angle of the outgoing light. Therefore, some of the light beams deviate from the core, or even when it reaches the core, an incident angle to the core is equal to or larger than a critical angle, and therefore the light is not propagated through the single optical fiber so as to deteriorate coupling efficiency. For example, when a standard semiconductor laser is used, the coupling loss is approximately 6 dB.

On the other hand, the method using a convex lens involves problems that mutual alignment of the optical axes among a semiconductor laser 2, lenses 3, 4 of the semiconductor laser, the lens, and the optical fiber 1 is complicated, thereby increasing the manufacturing cost, while relatively high coupling efficiency is obtained, as shown in block diagrams of FIGS. 1 (a) and (b). FIG. 1(a) is a view illustrating optical coupling wherein outgoing light from the semiconductor laser 2 is adjusted to be a light 5 with an angle that is receivable by the optical fiber 1, by the convex aspheric lens 3, and light is condensed and introduced to a core 1a of the optical fiber 1. FIG. 1(b) is a view illustrating optical coupling wherein outgoing light from the semiconductor laser 2 is parallelized by the convex lens 3, and the parallel light beam 5 is condensed and introduced into the core 1a of the optical fiber 1, by the opposing counter lens 4. In FIG. 1(b), 2a denotes an active layer of the semiconductor laser 2, 6 denotes a supporting stand, 7 denotes a XYZθ stage, and 8 denotes a table.

The construction of FIG. 1(a) is a common construction currently adopted in optical communication using the DFB (distributed feed back) semiconductor laser. Especially in using the DFB semiconductor laser, an optical isolator (not shown) should be inserted between the convex aspheric lens 3 and the optical fiber 1 for preventing reflected light from the optical fiber from returning to the semiconductor laser, and therefore generally adopted from the viewpoint of saving space. How ever, if an ideal optical axis common to the semiconductor laser 2, the convex aspheric lens 3 and the optical fiber 1 is represented by a broken line C, and a direction parallel to the optical axis C is prescribed to be the Z direction, a direction perpendicular to the horizontal direction to be the X direction and a direction perpendicular to the vertical direction to be the Y direction, imperfect alignment in the end face of the optical fiber 1 is attributed to displacement in the X direction, a tilt angle θx in the X direction, displacement in the Y direction, a tilt angle θy in the Y direction and displacement in the Z direction. Especially in such an optical system, light of the semiconductor laser is condensed smaller on the end face of the core 1a (radius: about 6 μm) of the optical fiber 1 by the aspheric lens 3, and each optical axis should be therefore conformed with submicron precision for high coupling efficiency, so that it usually took a dozen minutes to adjust the cores, and the cost of manufacturing was significantly increased.

Although the optical isolator can be reliably inserted even in the construction of FIG. 1(b), the number of optical components for alignment of the optical axes is increased, and it takes a significant amount of time to adjust the cores under these circumstances. This was a factor increasing the cost of manufacture.

The lens 4 is commonly called a collimator lens. If the lens 4 and the optical fiber 1 are united with optical axes being mutually conformed (fusion splice: optical fiber with collimator lens), imperfect alignment at the end face position of the optical fiber 1 is attributed to only displacement in the X direction, the tilt angle θx in the X direction, displacement in the Y direction, and the tilt angle θy in the Y direction (displacement in the Z direction is absent), consequently alignment of the optical axes of the lens 4 and the optical fiber is unnecessary. Especially in such an optical system, the divergence radius of the parallel light beam 5 is several tens of micrometers and is broad, and coupling efficiency is therefore enhanced even with several micron precision of alignment of the optical axes, so that its productivity is obviously improved to several tens of times in comparison with the optical system of FIG. 1(a).

The lens 4 of FIG. 1(b), called a collimator lens, usually employs a columnar distributed index lens (Graded Index lens: hereinafter "GRIN lens") because of common ease in attachment. In the GRIN lens shown in FIG. 2, when the refractive index n in the cross-section directions X and Y is represented by the following equation (1), the refractive index in the columnar center axis is highest, and the farther the point leaves from the center axis to the periphery, the lower the refractive index continuously becomes, in a quadratic curve (parabolic curve). Operation of the lens is carried out by this refractive index distribution.

$$n = n_0 \{1 - g^2 r^2 / 2\} \quad (1)$$

In this equation, g is a constant expressing a light-condensing performance (refractive index distribution constant) of the GRIN lens, $n_0$ is the refractive index (refractive index of the center part) of the material of the GRIN lens, and r is a radial direction ($r^2 = x^2 + y^2$). In FIG. 1, if the radius of the GRIN lens is a, and the refractive index at the radius a is $n_a$, g is represented as follows.

$$g = NA/an_0, \text{ wherein } NA = (n_0^2 - n_a^2)^{1/2} \quad (2)$$

In this equation, NA is square root of square-difference between the refractive indexes of the center and the periphery in the GRIN lens, which is called Numerical Aperture (hereinafter "NA"), and is an important parameter presenting lens performance. A high NA lens has good lens characteristics that are high light focusing abilities.

The length of the GRIN lens used as the collimator lens is set as follows, if the cycle length of ¼ as long as a zigzag cycle of a light propagated through the GRIN lens is L¼.

$$L\frac{1}{4}=\pi/(2g) \qquad (3)$$

Alternatively, the length may be prescribed to be an odd-number of times the length of ¼ of the zigzag cycle.

Further, the GRIN lens is conventionally made of a multi-component glass, and its softening point is about 500 to 600° C. Therefore, such a GRIN lens can not be fusion-spliced with the optical fiber, which is mainly composed of quartz glass. Thus, an optical adhesive is used, thereby posing problems in that it is difficult to align the opticalexes, and an optical characteristic is deteriorated by a change in the quality of the adhesive caused by temperature-rise, when the adhesive absorbs the light and high intensity light thereby enters. Consequently, unification of the convex lens 4 and the optical fiber 1 with optical axes mutually conformed (optical fiber with collimator) was impossible.

In order to solve such a problem of connection deterioration, a structure using GI (Graded-Index) optical fiber as a lens has been proposed, as disclosed in U.S. Pat. No. 4,701,011 and U.S. Pat. No. 5,384,874. The GI optical fiber is the optical fiber in which the refractive index of a core part changes in a radial direction. Since the GI optical fiber is made of the same quartz as the optical fiber, the GI optical fiber can be fusion spliced with the optical fiber. Therefore, it can be expected that the GI optical fiber will have high durability against light of high intensity. However, common GI optical fiber is made by the gas phase CVD (Chemical Vapor Deposition) method. In the gas phase method, operability is inefficient in actual unification as the collimator lens, in term of alignment of thermal expansibility like that makes the base material fragile due to increased coefficient of thermal expansion when amounts of the additives ($GeO_2$, $P_2O_5$ or the like) are increased, or in term of controllability of the refractive index.

Patent document 1: U.S. Pat. No. 3,910,677
Patent document 2: U.S. Pat. No. 4,701,011
Patent document 3: U.S. Pat. No. 5,384,874

SUMMARY OF THE INVENTION

As mentioned above, the conventional processes had been significantly troublesome because complex and subtle adjustment of the cores in multiaxial directions was required. The present invention has been achieved in light of the above circumstances and takes as its object to provide an optical fiber coupling part, which is capable of reducing the difficulty in adjusting cores, minimizing coupling loss, and avoiding deterioration of optical characteristics, and a manufacturing method thereof.

Means for Solving the Problems

The present invention is an optical fiber coupling part wherein the optical fiber is fused to one end of a GRIN lens (Graded Index lens) which comprises a quartz glass containing one or more refractive index regulating substances selected from $Sb_2O_3$, $Ta_2O_5$, $TiO_2$ or $ZrO_2$.

The present invention is a method of manufacturing the optical fiber coupling part which comprises the steps of: making a wet gel by mixing a silicon alkoxide, an alcohol, an acid or a base as a solvent, and a refractive index regulating substance; providing a concentration distribution of the refractive index regulating substance in the wet gel; making a dry gel by drying the wet gel; making a glass body by baking the dry gel; spinning the glass body into a thread; making the GRIN lens by cutting the spun thread into the cycle length of ¼, or an odd number times of it, as long as a zigzag cycle of a propagated light; and fusing the optical fiber to one end of the GRIN lens.

The silicon alkoxide may be a tetramethoxysilane $Si(OCH_3)_4$, a tetraethoxysilane $Si(OC_2H_5)_4$ or the like, the alcohol may be methanol $CH_3OH$, ethanol $C_2H_5OH$ or the like, the acid as a solvent may be hydrochloric acid HCL or the like, and the base may be ammonia water $NH_4OH$ or the like.

The Effects of the Invention

The optical fiber coupling part of the present invention, in which the GRIN lens and the optical fiber are unified, effectively facilitates alignment of axes in coupling the semiconductor laser and the optical fiber. Additionally, fusion of the GRIN lens and the optical fiber enables automatic concordance of the axes of the GRIN lens and the optical fiber by a self-alignment effect resulting from a surface tension in fusion, effectively facilitates manufacture and allows large scale production. Since an adhesive is not used, problems of deterioration of optical characteristics, due to alteration of the adhesive by the increased temperature when high-intensity light enters, are not caused. Furthermore, coupling loss in the semiconductor laser module can be reduced by setting a refractive index distribution constant g of the GRIN lens within an appropriate range.

EXPLANATION OF REFERENCE NUMERALS

Figure 1A:
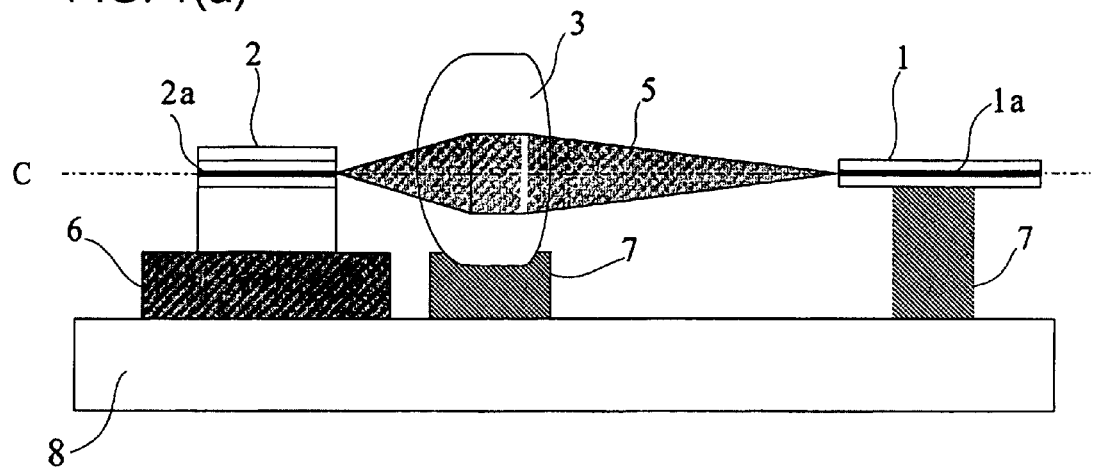
FIG. 1 is a view illustrating an example of coupling of the semiconductor laser and the optical fiber.

1: optical fiber
1a: core
2: semiconductor laser
2a: active layer
3: convex lens
4: lens
5: light
6: supporting stand
7: XYZθ stage
8: table

DETAILED DESCRIPTION OF THE INVENTION

The GRIN lens in the present invention is manufactured by a sol-gel method on the basis of a low-temperature synthesis method. In the sol-gel method, when $H_2O$ for hydrolysis and an alcohol for miscibility with materials in hydrolysis are added to a $Si(OR)_4$ (R: alkyl group) as a material and an alkoxide of an additive element such as Ti, and mixed, emulsification is caused (sol state) by $SiO_2$ particle which is formed with the progress of hydrolysis, and then the viscosity of the solution is rapidly increased with decreased fluidity, resulting in a state of a pudding-like gel. The gel is dried, and rendered a sintered glass while gradually removing the alcohol and $H_2O$, which remain on the surface by adsorption or the like. The glass synthesis based on the sol-gel method has the following characteristics: (1) reduction of frequency of crystallization by low-temperature sintering; (2) synthesis of homogenous glass on the molecular level; (3) wide selectivity of materials including high-melting point materials; and (4) possible reduction of cost of manufacture by high-yield performance in material synthesis. Application of the sol-gel process with these characteristics may enable manufacture of the inexpensive GRIN lens in which the NA is potentially high, controllability of the refractive index is good, and the coefficient of thermal expansion is almost equal to that of quartz glasses.

When the refractive index of binary silica glass was estimated, the composition of the GRIN lens potentially included $SiO_2$—$Bi_2O_3$, —$In_2O_3$, —$Y_2O_3$, —$La_2O_3$, —$Ga_3O_2$, —$Sb_2O_3$, —$Gd_2O_3$, —$Nb_2O_5$, —$SnO_2$, —$Ta_2O_5$, —$TiO_2$, and —$ZrO_2$-based quartz glasses. In the compositions including Bi, In, Y and La of the above compositions, the gel could not be made because all of their alkoxides were poorly-soluble solids. In the compositions including Gd and Ga, the gel was obtained only in a region with small additives (20 mol % or less to Si content). The glasses with Nb and Sn were unsuitable for the GRIN lens because a crystalline substance was present and the coefficient of thermal expansion was too high. The above results of examination revealed that $SiO_2$—$Sb_2O_3$, $SiO_2$—$Ta_2O_5$, $SiO_2$—$TiO_2$ and $SiO_2$—$ZrO_2$-based quartz glasses could enable manufacture of the GRIN lens in which the NA was potentially high, controllability of the refractive index was good, and the coefficient of thermal expansion was $15 \times 10^{-7} K^{-1}$ or less and approximately equal to that of the quartz glass, in comparison with that of the quartz $5 \times 10^{-7} K^{-1}$. But the glass with Sb had instability as the additive element Sb evaporated in sintering the gel, and the glass with Zr, in which the hydrolysis reaction was relatively fast, also had instability as a small amount of precipitation was formed in the solvent, methanol, in the manufacturing process of the gel. The above results of examination revealed that $SiO_2$—$Sb_2O_3$, $SiO_2$—$Ta_2O_5$, $SiO_2$—$TiO_2$ and $SiO_2$—$ZrO_2$-based quartz glasses, desirably $SiO_2$—$Ta_2O_5$ and $SiO_2$—$TiO_2$-based quartz glasses in consideration of stability of the process, could enable manufacture of the GRIN lens in which the coefficient of thermal expansion was approximately equal to that of the quartz glass, the NA was potentially high and controllability of the refractive index was good.

In the collimator lens of the present invention, a fusion splice with the optical fiber (optical fiber with collimator lens) is possible because of $SiO_2$—$Ta_2O_5$ and $SiO_2$—$TiO_2$-based quartz glasses used as chief ingredients, so that the center axes of the optical fiber and the GRIN lens can be conformed without precise alignment of the axes which was the conventional concern of self-alignment effects resulting from equilibrating of the surface tension when the optical fiber and the GRIN lens, which have the approximately same shapes of cross section, are fused over an oxyhydrogen burner flame or the like, with a great merit of widely improved unification performance. Fusion splicing is an essential technique for improvement in productivity. A fusion splice not only reduces light, which is reflected from the boundary surface of the optical fiber and the lens and returns to the semiconductor laser, but also solves problems regarding deterioration of optical characteristics due to alteration of the adhesive by increased temperature when high-intensity light enters by light absorption of the adhesive just as in coupling with conventional adhesives.

Figure 3:
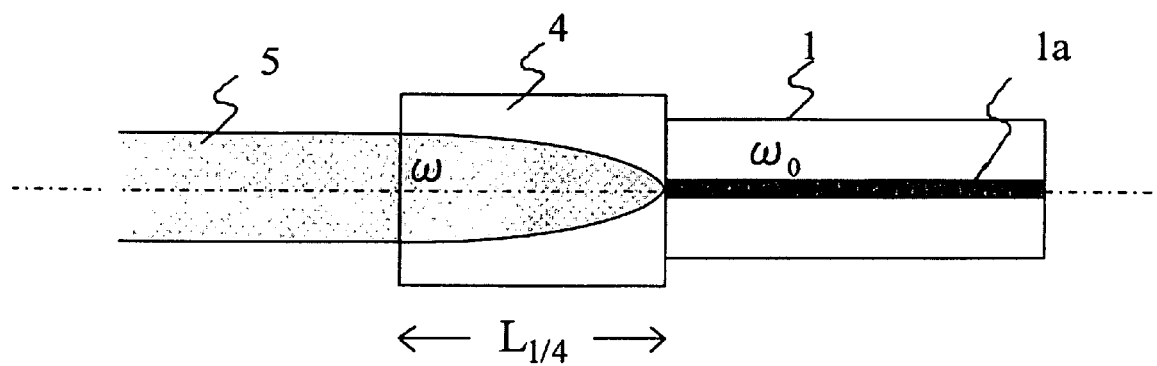
FIG. 3 is a view illustrating the optical fiber coupling part.

Subsequently, conditions necessary to provide a maximum coupling efficiency are examined. FIG. 3 is a sectional view illustrating that the parallel beam light 5, the GRIN collimator lens 4 and the optical fiber 1 are removed from FIG. 1(b). Here the direction that the light progresses is considered to be a reverse direction. If outgoing light from the core 1a of the optical fiber 1 enters the GRIN lens 4 spliced with the optical fiber 1 by fusion, an electric field distribution in the fundamental wave which passes through the lens is an approximately Gaussian distribution. As for Gaussian distribution, when the length L of the GRIN collimator lens 4 is the cycle length of ¼ as long as a zigzag cycle shown in Equation (3) i.e. L=L¼, a spot size ω of the electric field distribution in the fundamental wave near the end face of the GRIN collimator lens 4 is represented as $$\omega = 2/\omega_0 k n_0 g \quad (4)$$

and the light goes out from the end face of the GRIN collimator lens 4 as the optical beam 5 with Gaussian distribution about parallel to the optical axes of the optical fiber 1 and the GRIN collimator lens 4, wherein $\omega_0$ is the spot size of the electric field distribution in the single mode optical fiber, and when the single mode optical fiber is in the structure with approximately cutoff frequency ($\approx 2.4$) and the radius of the core 1a in the optical fiber 1 is a 0, an equation $\omega_0 \approx 1.1 a_0$ is approximately given. And when k is a wavenumber and the wavelength of light is λ, an equation $k = 2\pi/\lambda$ is given.

Figure 1B:
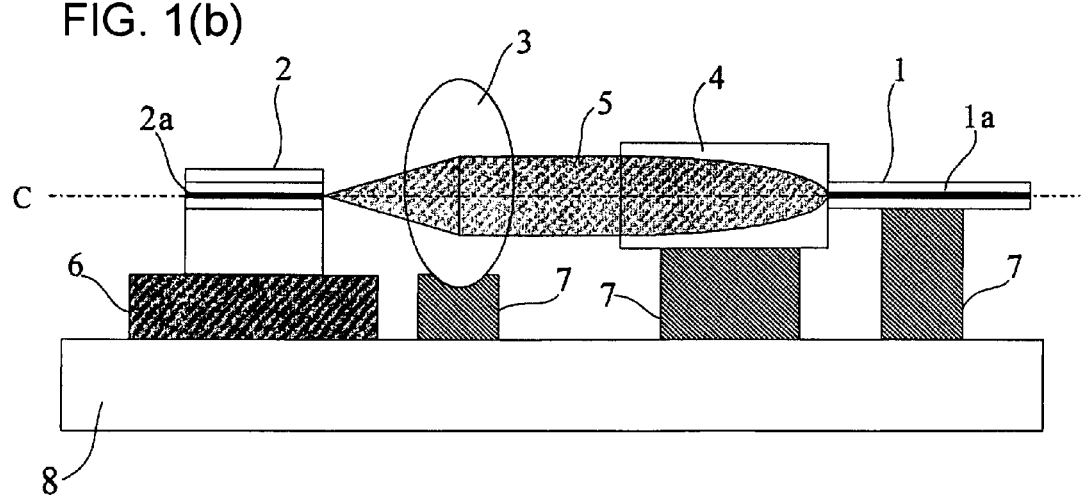
Figure 2:
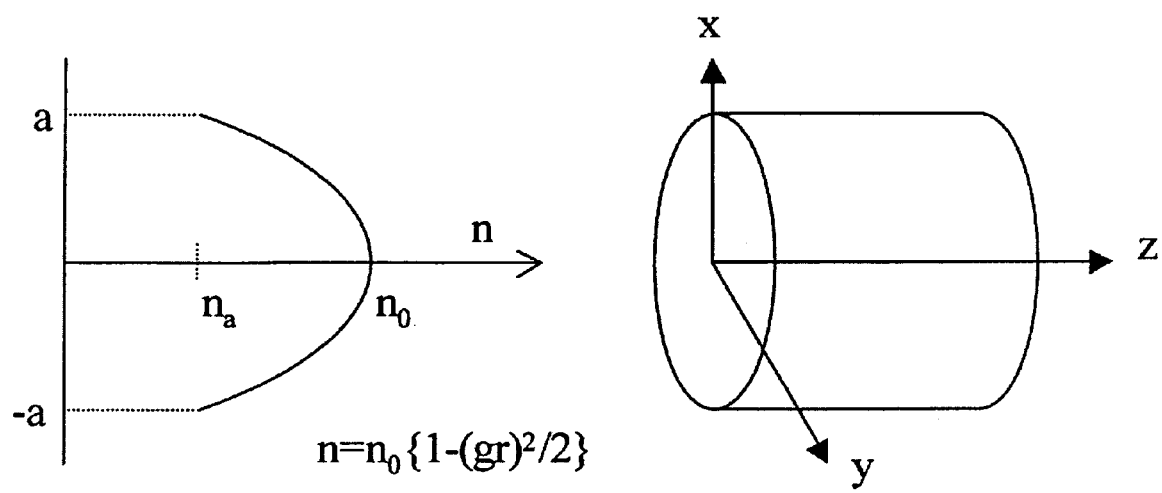
FIG. 2 is a view illustrating the refractive index distribution of the GRIN lens.

The above description suggests that when the outgoing light from the semiconductor laser 2 is rendered the parallel light beam 5 by the convex lens 3, the electric field distribution of the parallel light beam has an approximately Gaussian distribution, so that coincidence of the spot size of Gaussian distribution with the ω of Equation (4) provides the maximum coupling efficiency. That means, when the spot size of the electric field distribution in the parallel light beam of FIG. 1b is ω, the refractive index distribution constant g or the numerical aperture of the collimator lens is represented by the following equation.

$$g = NA/n_0 a = 2/\omega_0 \omega k n_0, \text{ wherein } a \geq \omega \quad (5)$$

The GRIN lens which meets Equation (5) regardless of its shape is spliced with the optical fiber by fusion as a collimator lens, providing high coupling efficiency. Here the refractive index distribution constant g of the collimator lens is preferably the value which meets Equation (5), but even if an error in manufacturing the collimator is ±5%, the coupling loss is 0.4 dB or less and low as a collimator, and desirable coupling efficiency can be acquired. Consequently, the range of the refractive index distribution constant g is desirably expressed by $0.95 NA/n_0 a \leq g \leq 1.05 NA/n_0 a$.

EXAMPLE 1

9.2 ml of 2N hydrochloric acid was added to a mixture of 75.5 ml of a silicon tetramethoxide and 183.4 ml of isopropanol, and stirred for 30 min., then 30.8 ml of a titanium tetra-n-butoxide was added. Subsequently, 0.01 N ammonia water was added to obtain a wet gel. The wet gel was aged at 50° C. for two days, and soaked in 6N hydrochloric acid for two hours, providing a concentration distribution of titanium in the gel. Then the gel was soaked in methanol to rinse hydrochloric acid in the gel. The gel was soaked in 6N hydrochloric acid for 20 minutes for the second provision of the concentration distribution, then soaked in methanol to rinse hydrochloric acid as with the first step, and dried. Subsequently, the gel was soaked in 6N hydrochloric acid for 8 minutes for the third provision of the concentration distribution, then soaked in methanol to rinse hydrochloric acid as with the first step, and dried, resulting in a dry gel of 10 mm in diameter. The resulting dry gel was heated at 10° C./hr from room temperature to 350° C., and then heated to 1200° C. to bake, and the transparent glass body was obtained. Determination of refractive index distribution of the columnar glass body resulted in a prototype of the GRIN lens with NA (=0.5) which decreases in an approximately quadratic curve from the center to the periphery.

The prototype was spun into an optical fiber of 158 μm in outside diameter while inserted into an electric furnace of a carbon heater at 0.04 mm/s to manufacture a GRIN lens-shaped optical fiber. The refractive index distribution of the optical fiber was determined again and resulted in the GRIN lens-shaped optical fiber with NA (=0.5) which decreases in the approximately quadratic curve from the center to the periphery, wherein the refractive index distribution constant g was 0.0040 ($\mu m^{-1}$) when g was expressed by $g=0.98\ NA/n_0 a$.

The manufactured GRIN lens-shaped optical fiber was spliced with one end of the single mode optical fiber of 0.09 in numerical aperture by fusion using a discharge fusion splicer, and then cut into the cycle length of ¼ of a zigzag cycle of a light propagated through the GRIN lens, 389 μm, to obtain the optical fiber with the collimator lens.

The convex lens was inserted to the semiconductor laser (peak oscillation wavelength: 1330 nm, operating current: 16 mA, operating voltage: 1.0 V, full angle at half maximum in horizontal radiation: 20°, full angle at half maximum in vertical radiation: 25°) to obtain parallel light with spot size of 46 μm. Then, the parallel light was inserted to the obtained optical fiber with the collimator lens, showing that coupling loss was 0.4 dB or less and high coupling efficiency was obtained with little adjustment of the cores.

EXAMPLE 2

As in the case with Example 1, a prototype of the GRIN lens with NA (=0.5) which decreases in an approximately quadratic curve from the center to the periphery was obtained. The prototype was spun into an optical fiber of 166 μm in outside diameter while inserted into the electric furnace of the carbon heater at 0.04 mm/s to manufacture the GRIN lens-shaped optical fiber. The refractive index distribution of the optical fiber was determined again and resulted in a GRIN lens-shaped optical fiber with NA (=0.5) which decreases in an approximately quadratic curve from the center to the periphery, wherein the refractive index distribution constant g was 0.0042 ($\mu m^{-1}$) when g was expressed by $g=1.05\ NA/n_0 a$.

The manufactured GRIN lens-shaped optical fiber was spliced with one end of the single mode optical fiber of 0.09 in numerical aperture by fusion using the discharge fusion splicer, and then cut into the cycle length of ¼ of a zigzag cycle of a light propagated through the GRIN lens, 370 μm, to obtain the optical fiber with the collimator lens.

The convex lens was inserted into the semiconductor laser (peak oscillation wavelength: 1330 nm, operating current: 16 mA, operating voltage: 1.0 V, full angle at half maximum in horizontal radiation: 20°, full angle at half maximum in vertical radiation: 25°) to obtain parallel light with spot size of 46 μm. Then, the parallel light was inserted to the obtained optical fiber with the collimator lens, showing that coupling loss was 0.9 dB or less and high coupling efficiency was obtained with little adjustment of the cores.

The above embodiments are the cases of the $SiO_2$—$TiO_2$-based quartz glass. For instance, a tantalum ethoxide may be used as a substitute for the titanium tetra-n-butoxide in the case of the $SiO_2$—$Ta_2O_5$-based quartz glass, a triethylantimony may be used in the case of the $SiO_2$—$Sb_2O_3$-based quartz glass, and a zirconium propoxide may be used in the case of the $SiO_2$—$ZrO_2$-based quartz glass.

INDUSTRIAL APPLICABILITY

The optical fiber coupling part of the present invention can be utilized as a collimator, a collimator array or the like.

The invention claimed is:

1. A method of manufacturing an optical fiber coupling part, comprising:
    mixing a silicon alkoxide, an alcohol, an acid or a base as a solvent, and a refractive index regulating substance to make a wet gel, wherein the refractive index regulating substance includes tantalum, antimony and zirconium;
    providing a concentration distribution of the refractive index regulating substance in the wet gel;
    drying the wet gel to make a dry gel;
    baking the dry gel to make a glass body;
    spinning the glass body into a thread;
    cutting the spun thread into a cycle length of ¼ as long as a zigzag cycle of a light propagated through the thread or a length that is an odd number times a length of ¼ of the zigzag cycle to make a GRIN lens; and
    fusing an optical fiber to one end of the GRIN lens.

* * * * *